US010156490B2

(12) United States Patent
Singh et al.

(10) Patent No.: US 10,156,490 B2
(45) Date of Patent: Dec. 18, 2018

(54) PIEZOELECTRIC COATINGS FOR DOWNHOLE SENSING AND MONITORING

(71) Applicant: Schlumberger Technology Corporation, Sugar Land, TX (US)

(72) Inventors: Virendra Singh, Stafford, TX (US); Manuel P. Marya, Sugar Land, TX (US)

(73) Assignee: SCHLUMBERGER TECHNOLOGY CORPORATION, Sugar Land, TX (US)

(*) Notice: Subject to any disclaimer, the term of this patent is extended or adjusted under 35 U.S.C. 154(b) by 49 days.

(21) Appl. No.: 14/896,652

(22) PCT Filed: Jun. 6, 2014

(86) PCT No.: PCT/US2014/041194
§ 371 (c)(1),
(2) Date: Dec. 7, 2015

(87) PCT Pub. No.: WO2014/197750
PCT Pub. Date: Dec. 11, 2014

(65) Prior Publication Data
US 2016/0146966 A1   May 26, 2016

Related U.S. Application Data

(60) Provisional application No. 61/832,225, filed on Jun. 7, 2013.

(51) Int. Cl.
*G01L 9/06* (2006.01)
*G01L 9/08* (2006.01)
(Continued)

(52) U.S. Cl.
CPC .............. *G01L 9/06* (2013.01); *B05B 7/1404* (2013.01); *B05B 7/1486* (2013.01);
(Continued)

(58) Field of Classification Search
CPC ....... G01L 7/02; G01L 9/0001; G01L 9/0002; G01L 9/0027; G01L 9/02; G01L 9/06; G01L 9/08; G01V 3/18; E21B 47/06
(Continued)

(56) References Cited

U.S. PATENT DOCUMENTS 4,999,225 A * 3/1991 Rotolico ................. B05B 7/205
427/189
6,569,245 B2    5/2003 Krysa et al.
(Continued)

OTHER PUBLICATIONS

Chaipanich, A. et al., "Ferroelectric Hysteresis Behavior in 0-3 pzt-Cement Composites: Effects of Frequency and Electric Field", Ferroelectrics Letters Section, 2009, 36(3-4), pp. 59-66.
(Continued)

*Primary Examiner* — Benjamin Schmitt (57) ABSTRACT

A composite piezoelectric coating (CPC) method includes entraining a powder in a first carrier gas stream; heating a second carrier gas stream to a predetermined temperature; combining the first carrier gas stream and second carrier gas stream into a combined carrier gas stream; ejecting the combined carrier gas stream at a target at a predetermined velocity, and consolidating the powder on the target by impact of the ejected combined carrier gas stream with the target.

7 Claims, 8 Drawing Sheets

(51) Int. Cl.
  *B05B 7/14* (2006.01)
  *B05B 7/16* (2006.01)
  *B05D 1/12* (2006.01)
  *C23C 24/04* (2006.01)
  *E21B 47/06* (2012.01)
  *G01V 3/18* (2006.01)

(52) U.S. Cl.
  CPC .............. *B05B 7/1626* (2013.01); *B05D 1/12* (2013.01); *C23C 24/04* (2013.01); *E21B 47/06* (2013.01); *G01L 9/08* (2013.01); *G01V 3/18* (2013.01)

(58) Field of Classification Search
  USPC ....................................................... 73/152.51
  See application file for complete search history.

(56) References Cited

U.S. PATENT DOCUMENTS

| | | |
|---|---|---|
| 7,325,605 B2 | 2/2008 | Fripp et al. |
| 7,460,435 B2 | 12/2008 | Garcia-Osuna et al. |
| 7,513,147 B2 | 4/2009 | Yogeswaren |
| 7,536,912 B2 | 5/2009 | Kim |
| 7,807,216 B2 | 10/2010 | Zhu et al. |
| 2004/0174097 A1 | 9/2004 | Hasegawa et al. |
| 2006/0067029 A1* | 3/2006 | Kuniyasu ............... H01G 4/232 361/302 |
| 2006/0124057 A1 | 6/2006 | Sasaki |
| 2006/0152375 A1* | 7/2006 | Ogino ...................... G01L 1/26 340/626 |
| 2006/0260402 A1 | 11/2006 | Kim |

OTHER PUBLICATIONS

Chaipanich, A. et al., "Fabrication and Properties of PZT-Ordinary Portland Cement Composites", Materials Letters, 2007, 61(30), pp. 5206-5208.

Dent, A. H. et al., "High Velocity Oxy-Fuel and Plasma Deposition of BaTiO3 and (Ba,Sr)TiO3", Materials Science and Engineering B, 2001, 87(1), pp. 23-30.

Dong, B. Q. et al., "Cement-Based Piezoelectric Ceramic Smart Composites", Composites Science and Technology, 2005, 65(9), pp. 1363-1371.

Search Report and Written Opinion of International Application No. PCT/US2014/041194 dated Sep. 26, 2015, 13 pages.

\* cited by examiner

PIEZOELECTRIC COATINGS FOR DOWNHOLE SENSING AND MONITORING

CROSS-REFERENCE TO RELATED APPLICATIONS

This application is a non-provisional patent application of U.S. Provisional Patent Application Ser. No. 61/832,225, filed on Jun. 7, 2013, and entitled: "PIEZOELECTRIC COATINGS FOR DOWNHOLE SENSING AND MONITORING." Accordingly, this non-provisional patent application claims priority to U.S. Provisional Patent Application Ser. No. 61/832,225 under 35 U.S.C. § 119(e). U.S. Provisional Patent Application Ser. No. 61/832,225 is hereby incorporated in its entirety.

BACKGROUND

Hydrocarbon fluids such as oil and natural gas are obtained from a subterranean geologic formation, referred to as a reservoir, by drilling a well that penetrates the hydrocarbon-bearing formation. Once a wellbore is drilled, various forms of well completion components may be installed in order to control and enhance the efficiency of producing the various fluids from the reservoir.

Environmental conditions within a well and around tools or other completion components impact the operation of the well. Sensors are used to determine the local environmental conditions within the well. Many sensors rely on transducers that convert pressure to electrical signals. Pressure transducers convert a local environmental pressure to electrical signals and sometimes rely on the piezoelectric effect in operation.

Sensors that utilize the piezoelectric effect have well known limitations due to limitations of the base materials relied upon to produce the piezoelectric effect. Improvement of the characteristic of the base materials may improve sensors produced using the base materials.

SUMMARY

In general, in one aspect, embodiments relate to a composite piezoelectric coating (CPC) method including entraining a powder in a first carrier gas stream; heating a second carrier gas stream to a predetermined temperature; combining the first carrier gas stream and second carrier gas stream into a combined carrier gas stream; ejecting the combined carrier gas stream at a target at a predetermined velocity, and consolidating the powder on the target by impact of the ejected combined carrier gas stream with the target.

In general, in one aspect, embodiments relate to a pressure transducer including a first electrode; a second electrode; and a composite piezoelectric coating (CPC). During an active mode, the CPC may expand or contract in size based on a voltage applied across the first electrode and second electrode. During a passive mode, the CPC may generate a voltage across the first electrode and second electrode based on an applied pressure.

In general, in one aspect, embodiments relate to a system of pressure transducers, including: a first pressure transducer and a second pressure transducer. The first pressure transducer includes a first electrode; a second electrode; and a first composite piezoelectric coating (CPC) that may expand or contract in response to a first voltage applied across a first electrode and a second electrode and transmit the expansion or contraction as a pressure wave. The second pressure transducer includes a third electrode; a fourth electrode; and a second composite piezoelectric coating (CPC) that may receive the transmitted pressure wave as an expansion or contraction and generate a second voltage across a third electrode and fourth electrode.

Other aspects of the disclosure will be apparent from the following description and the appended claims.

BRIEF DESCRIPTION OF DRAWINGS

Certain embodiments of the disclosure will hereafter be described with reference to the accompanying drawings. It should be understood, however, that the accompanying drawings illustrate the various implementations described herein and are not meant to limit the scope of various technologies described herein. The drawings show and describe various embodiments of the current disclosure.

DETAILED DESCRIPTION

Specific embodiments will now be described in detail with reference to the accompanying figures. Numerous details are set forth to provide an understanding of the present disclosure. However, it will be understood by those skilled in the art that the embodiments of the present disclosure may be practiced without these details and that numerous variations or modifications from the described embodiments may be possible.

In the specification and appended claims: the terms "connect," "connection," "connected," "in connection with," and "connecting" are used to mean "in direct connection with" or "in connection with via one or more elements;" and the term "set" is used to mean "one element" or "more than one element." Further, the terms "couple," "coupling," "coupled," "coupled together," and "coupled with" are used to mean "directly coupled together" or "coupled together via one or more elements." As used herein, the terms "up" and "down," "upper" and "lower," "upwardly" and "downwardly," "upstream" and "downstream;" "above" and "below;" and other like terms indicating relative positions above or below a given point or element are used in this description to more clearly describe some embodiments of the disclosure.

Embodiments may include a fabrication method for piezo-composite coatings applicable to the oilfields, pressure/stress sensing, structural health monitoring and flow measurements (via pressure monitoring), alone or in combination. Other embodiments may apply such coatings to real-time monitor multi-stage fracturing. In an example method, pressure developed during fracturing induces a signal via the piezo sensing coating on a ball, dart, or seats which may be transmitted to the surface to indicate zone isolation is established and fracturing occurs in a given zone. Vice-versa, the disappearance of the signal may indicate zone communication and the end of a specific zone fracturing. Such coating may be used with a degradable components such as balls or darts and receptacles, commonly referred to as seats, within a well that when used in conjunction create isolated zones within a well.

Also, embodiments may include the fabrication method relying on high-velocity "cold" sprayed piezoelectric and polymer mixed powders. The high kinetic energy cold spray process deforms the polymer particles around piezoelectric ceramic particles deposited onto a selected tool component surface in total absence of polymer thermal decomposition. The piezoelectric material may be selected from lead zirconate titanate (PZT) family in doped condition having high piezoelectric charge constant (d33), for example.

Figure 1:
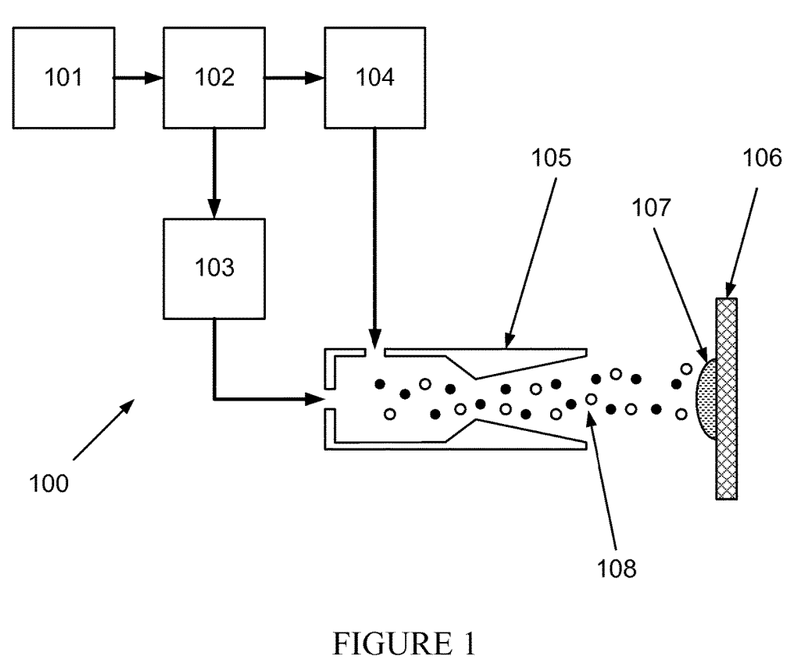
FIG. 1 shows a method in accordance with one or more embodiments.

FIG. 1 shows a method (100) in accordance with one or more embodiments. More specifically, FIG. 1 shows a method for creating a composite piezoelectric coating (CPC) (107). As part of the method, a carrier gas supply (101) feeds carrier gas to a gas control module (102). In one or more embodiments the gas is nitrogen, helium, air, or any other inert gas. The gas control module (102) separates the carrier gas into two separate streams and feeds a first carrier gas stream to a heater (103) and a second carrier gas stream to a powder feeder (104). The flow rate of each carrier gas stream is controlled independently. The heater (103) heats the first carrier gas stream to a predetermined temperature which may simply be room temperature or an elevated temperature such as 100 degrees Celsius. Once heated, the first carrier gas stream leaves the heater (103) and is fed to a supersonic nozzle (105). The powder feeder (104) entrains a powder (108) in the second carrier gas stream.

In one or more embodiments, the powder may be a combination of a piezoelectric material and a second material. In one or more embodiments, the piezoelectric material may be one selected from the lead zirconate titanate family (soft piezoelectric for ultrasonic transmitter and receivers, and hard piezoelectric for high power acoustics). The modification of base composition of lead zirconate titanate is carried out by doping of Lanthanum, niobium, Iron nickel, etc. (Transition elements). In one or more embodiments, the second material may be polypropylene, polyimide, polytetrafluoroethylene, Polyvinylidene fluoride (PVDF), P(VDF-tetrafluoroethylene), phenolics, epoxies, Peek, or Pek. In one or more embodiments, the second material may be a silicon based material. The ratio of piezoelectric material to second material in the powder is carefully controlled and will be discussed in more detail. In one or more embodiments, the powder may have an average particle size between 0.001 and 0.1 mm.

Once the powder is entrained, the second carrier gas stream exits the powder feeder (104) and is fed to the supersonic nozzle (105). The first carrier gas stream and second carrier gas stream are combined upon entering the supersonic nozzle (105). After combination, the combined carrier gas streams are ejected at high velocity from the super sonic nozzle (105). In one or more embodiments, the ejection velocity is between 10 and 1200 meter per second.

After ejection from the super sonic nozzle (105), the carrier gas stream impacts a target (106). In one or more embodiments, the target may be a tool, degradable component, ball, seat, dart, flow control valve, multi-cycle valve, cylindrical tool, or a part of a transducer or sensor. Upon impacting the target (106), the powder entrained (108) in the gas stream is consolidated into a CPC (107) by the kinetic energy of the impact.

In one or more embodiments, the temperature of the powder before, during, and after consolidation is kept below the melting point of the powder. The kinetic energy of the powder compresses the powder and removes any void space. In one or more embodiments, the ratio of piezoelectric material to second material in the powder is controlled to create a CPC (107) that contains a percolated matrix of piezoelectric material that is encapsulated by a second material.

In one or more embodiments of the invention, a CPC (107) may be deposited over a large area of a wellbore, completion component, or tool as discussed in the CPC creation method. The CPC (107) disposed over a large area is sensitive to changes in pressure over the entire area of the CPC. For example, a CPC (107) could be disposed over a large enough area to sense multiple pressures within a well. A change in any one of the pressures could be sensed by the CPC (107).

Figure 2:
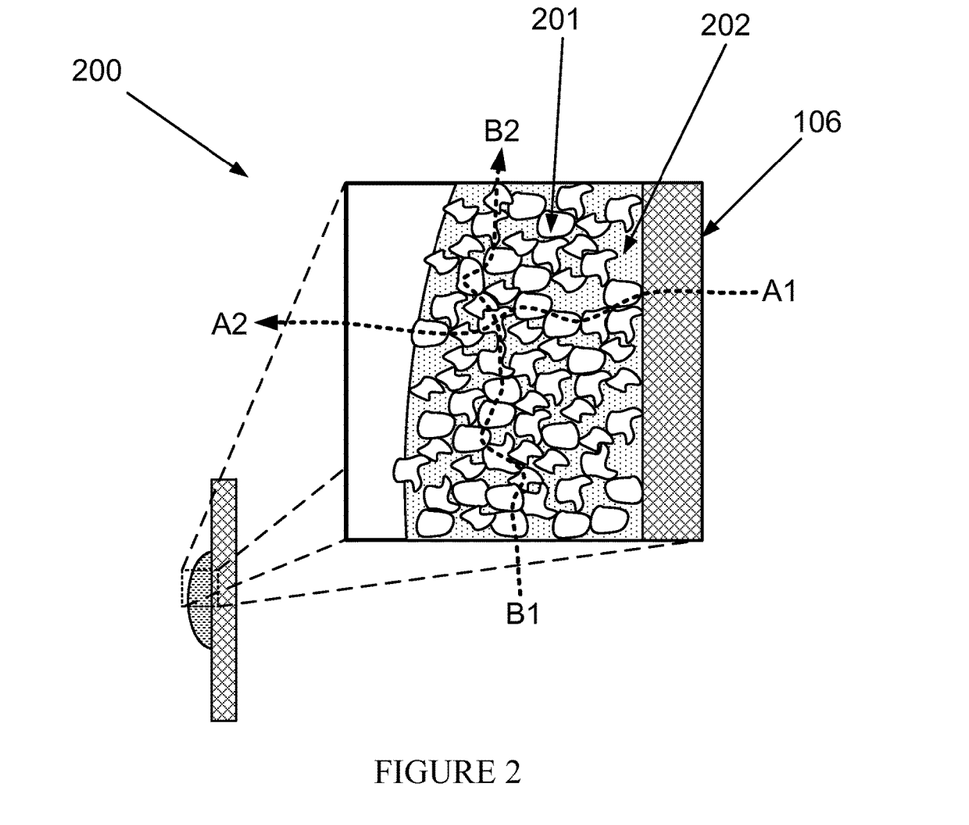
FIG. 2 shows a composite piezoelectric coating in accordance with one or more embodiments.

FIG. 2 shows an illustration (200) of the CPC (107) on the target (106). The CPC contains a percolated matrix of piezoelectric material particles (201) that is surrounded by a second material (202). The percolated matrix of piezoelectric material particles (201) forms a continuous conduction path within the volume of the CPC (107). Two examples of conduction paths are shown in FIG. 2. Path A1 to A2 illustrates a conduction path between the surface of the CPC (107) in contact with the target (106) and the opposite surface of the CPC (107). Path B1 to B2 illustrates a conduction path along the length of the CPC (107).

Figure 3:
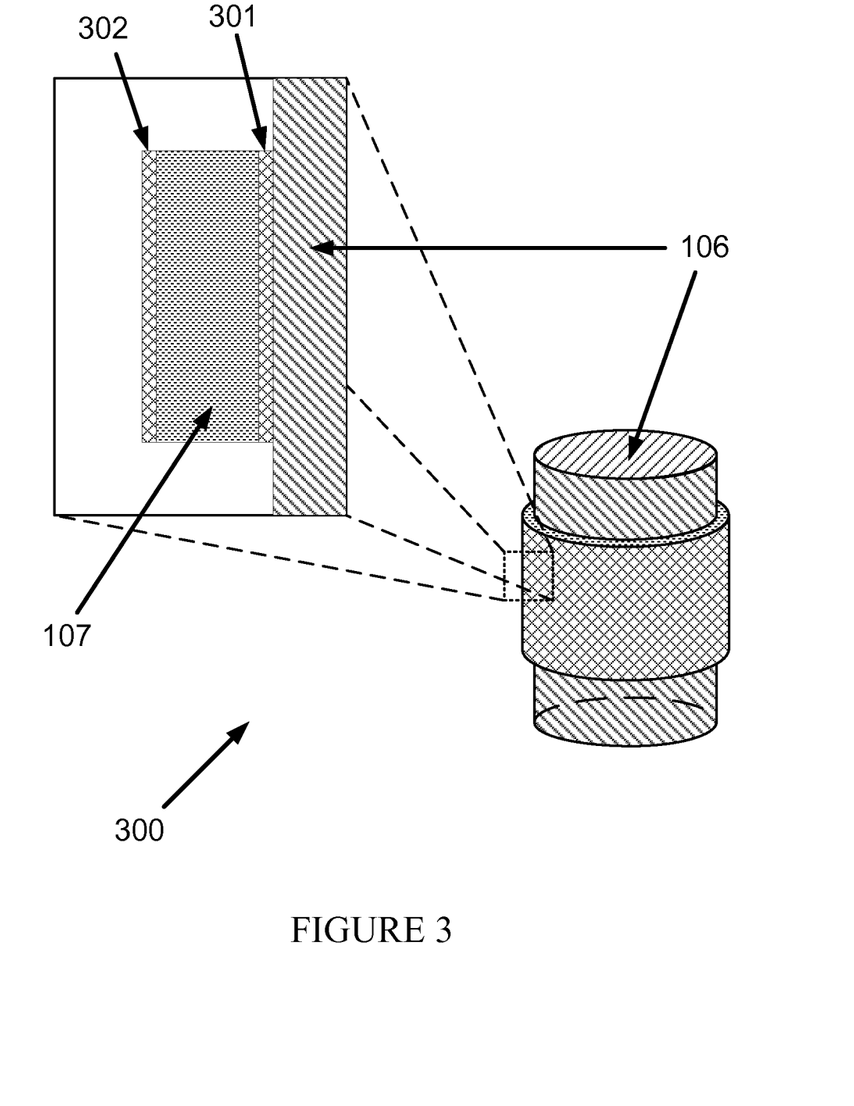
FIG. 3 shows a pressure transducer in accordance with one or more embodiments.

In accordance with one or more embodiments, FIG. 3 shows a pressure transducer (300) on a target (106). The target (106) in FIG. 3 is drawn as a cylinder but could be any shape, for example the inside of a hollow cylinder, well, or production conduit. The pressure transducer includes a first electrode (301), a second electrode (302), and a CPC (107). The CPC (107) is between the first electrode (301) and second electrode (302). In one or more embodiments, the first electrode (301) and second electrode (302) are silver, silver-palladium, or platinum-palladium.

Figure 4:
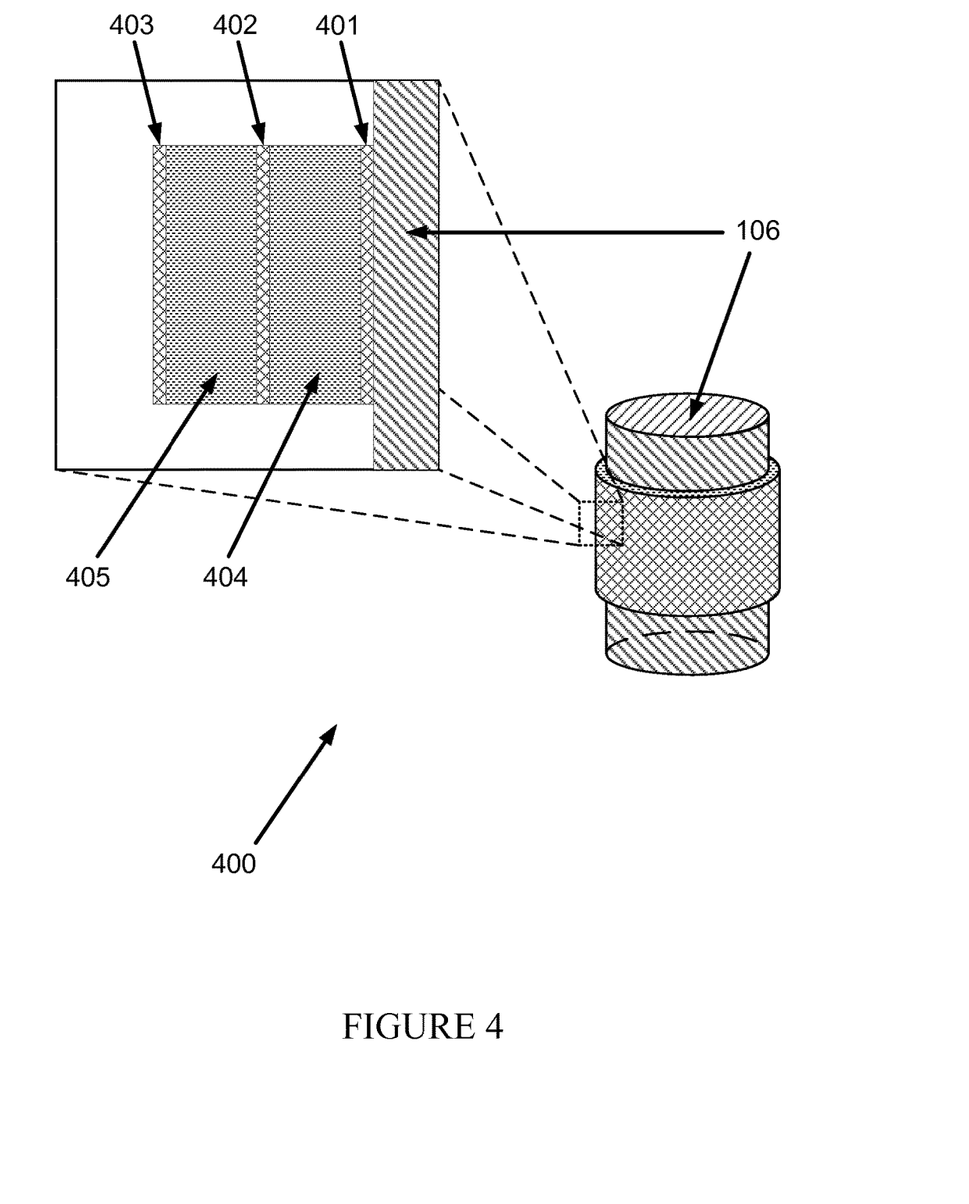
FIG. 4 shows a multilayer pressure transducer in accordance with one or more embodiments.

In accordance with one or more embodiments of the invention, FIG. 4 shows a multilayer pressure transducer (400) on a target (106). The multilayer pressure transducer (400) includes a first electrode (401), second electrode (402), third electrode (403), first CPC (405), and second CPC (406). In one or more embodiments the electrodes are silver, silver-palladium, or platinum-palladium. In FIG. 4, a multilayer pressure transducer (400) is shown containing two layers of CPC. A multilayer pressure transducer (400) may contain any number of CPC and electrode layers.

Figure 5:
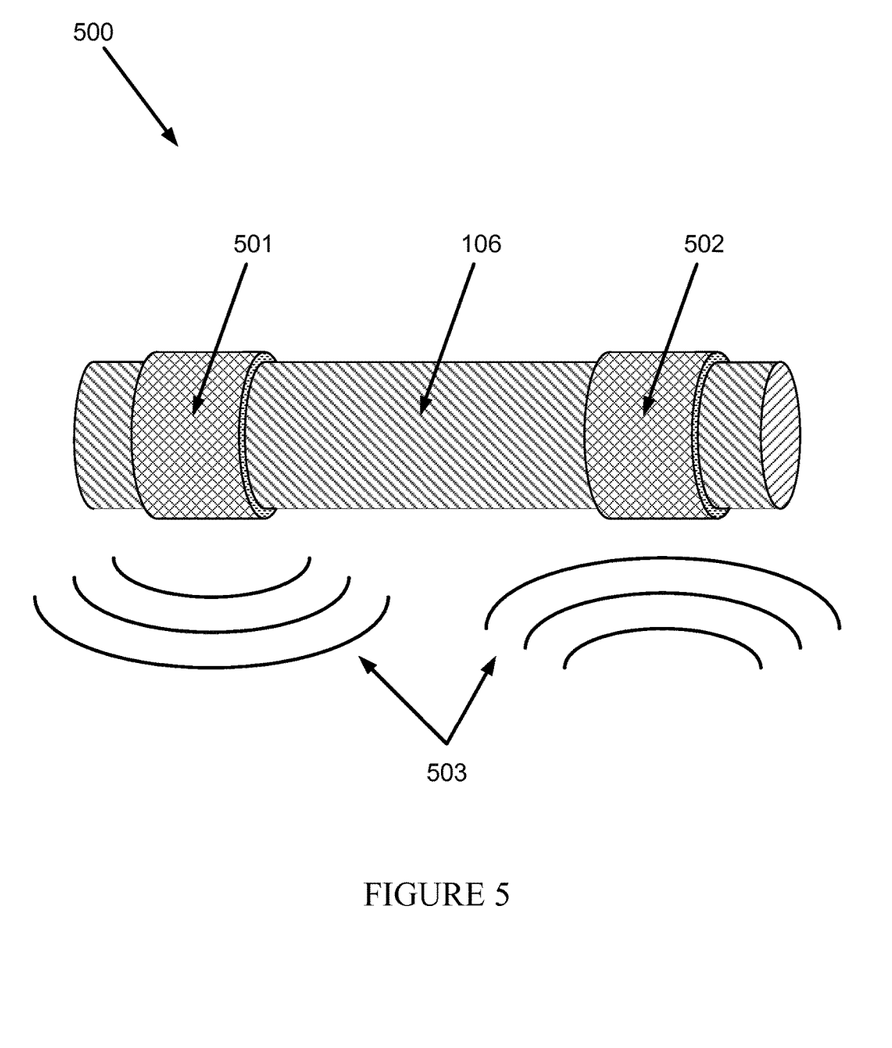
FIG. 5 shows a two pressure transducer system in accordance with one or more embodiments.

In accordance with one or more embodiments, FIG. 5 shows a two transducer system (500) on a target (106). The two transducer system (500) includes a first pressure transducer (501) and a second pressure transducer (502). The first pressure transducer (501) and second pressure transducer (502) may be a pressure transducer (300) as shown in FIG. 3 or a multilayer pressure transducer (400) shown in FIG. 4. In a two transducer system (500), the first pressure transducer (501) operates as a transmitter and the second pressure transducer (502) operates as a receiver.

Figure 6:
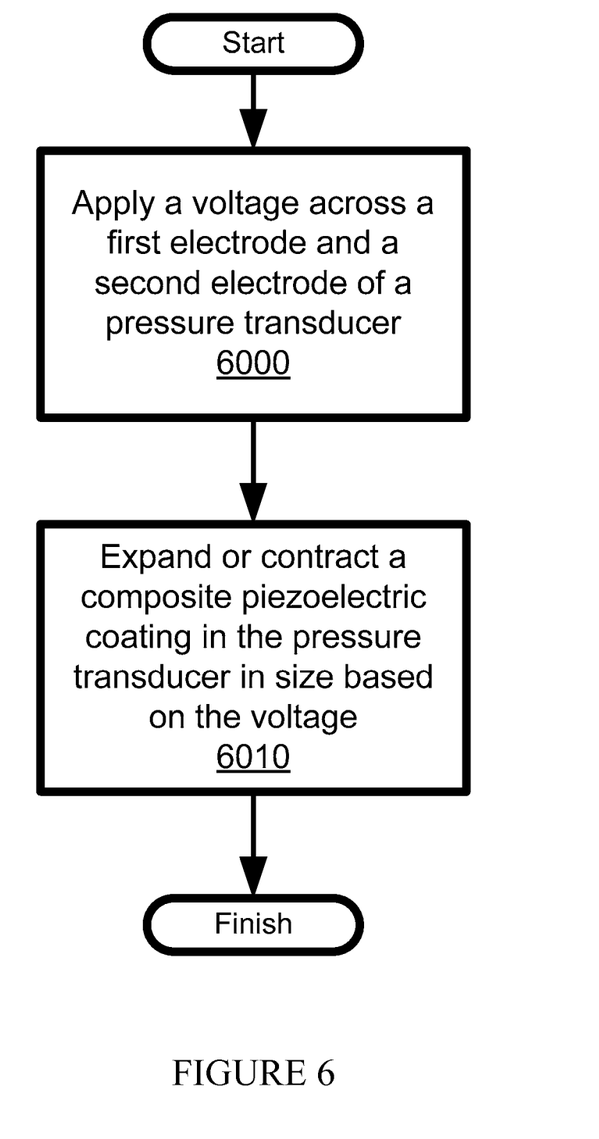
FIG. 6 shows a flow chart of a method in accordance with one or more embodiments.

FIG. 6 shows a flowchart in accordance with one or more embodiments. The method depicted in FIG. 6 may be used to operate the pressure transducer (300) in an active mode. One or more operations shown in FIG. 6 may be omitted, repeated, and/or performed in a different order among different embodiments of the invention. Accordingly, embodiments of the present disclosure should not be considered limited to the specific number and arrangement of operations shown in FIG. 6.

Initially, at 6000, a voltage is applied across a first electrode (301) and a second electrode (302) of a pressure transducer (300). In 6010, a CPC (107) in the pressure transducer (300) expands or contracts based on the voltage.

Figure 7:
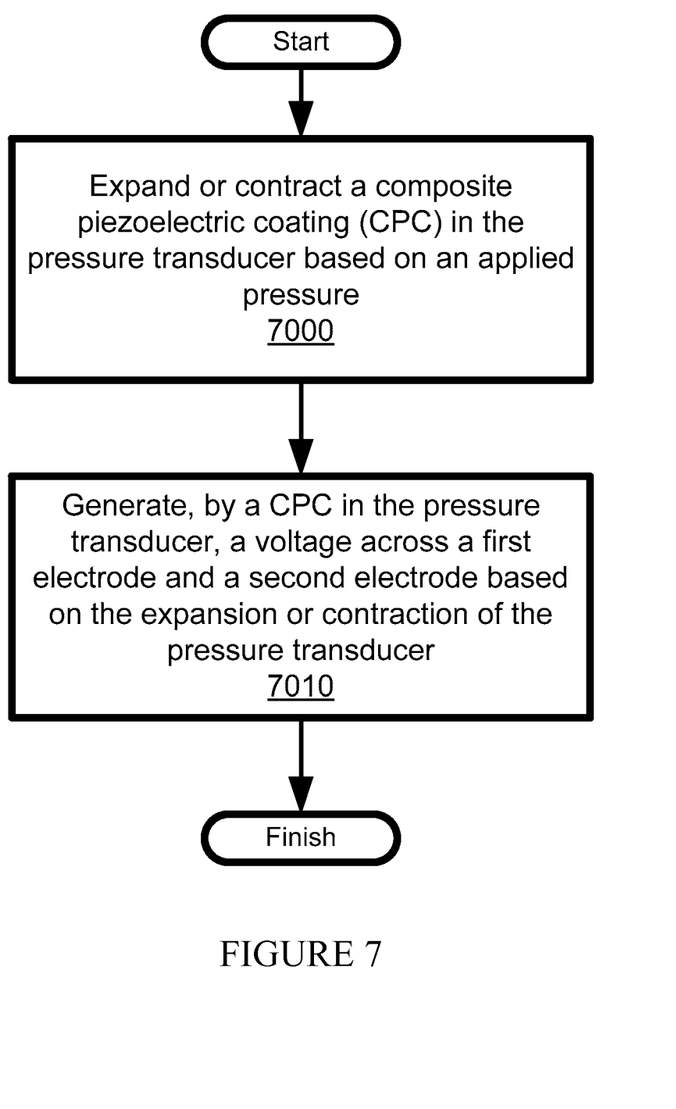
FIG. 7 shows a flow chart of a method in accordance with one or more embodiments.

FIG. 7 shows a flow chart in accordance with one or more embodiments. The method depicted in FIG. 7 may be used to operate the pressure transducer (300) in passive mode. One or more operations shown in FIG. 7 may be omitted, repeated, and/or performed in a different order among different embodiments of the invention. Accordingly, embodiments of the present disclosure should not be considered limited to the specific number and arrangement of operations shown in FIG. 7.

Initially, in 7000, a CPC (107) in the pressure transducer (300) expands or contracts in response to an applied pressure. In 7010, a voltage across a first electrode (301) and a second electrode (302) is generated by the CPC (107) in the pressure transducer (300) based on the expansion or contraction.

Figure 8:
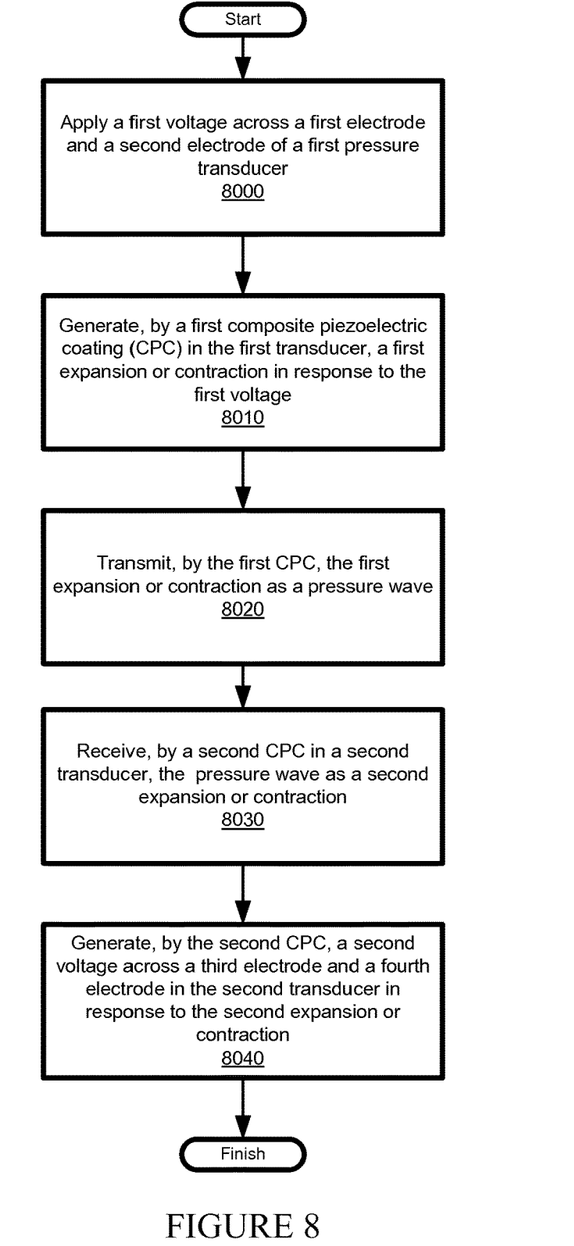
FIG. 8 shows a flow chart of a method in accordance with one or embodiments.

FIG. 8 shows a flow chart in accordance with one or more embodiments. The method depicted in FIG. 8 may be used to operate the two transducer system (500). One or more actions shown in FIG. 8 may be omitted, repeated, and/or performed in a different order among different embodiments. Accordingly, embodiments of the present disclosure should not be considered limited to the specific number and arrangement of operations shown in FIG. 8.

Initially, at 8000, a first voltage is applied across the first electrode (301) and the second electrode (302) of a first pressure transducer (501). In 8010, a first CPC (107) in a first transducer (501) generates a first expansion or contraction in response to the first voltage. In 8020, the first CPC (107) transmits the first expansion or contraction as a pressure wave (503). In 8030, the pressure wave (503) is received by a second CPC (107) in a second pressure transducer (502) as second expansion or contraction. In 8040, a voltage across a third electrode (301) and fourth electrode (302) in the second transducer (502) is generated by the second CPC (107) in the second transducer (502) in response to the second expansion or contraction.

Although the preceding description has been described herein with reference to particular means, materials, and embodiments, it is not intended to be limited to the particulars disclosed herein; rather it extends to all functionally equivalent structures, methods, and uses, such as are within the scope of the appended claims.

What is claimed is:

1. A pressure transducer comprising:
a first electrode;
a second electrode; and
a composite piezoelectric coating (CPC) configured to:
during an active mode, expand or contract in size based on a voltage applied across the first electrode and second electrode; and
during a passive mode, generate a voltage across the first electrode and second electrode based on an applied pressure,
wherein the CPC is disposed on a target via consolidation of a powder entrained in a carrier gas stream by impact of the carrier gas stream with the target,
wherein the powder further comprises:
a first quantity of a first powder of a piezoelectric material; and
a second quantity of a second powder combined with the first quantity of the first powder,
wherein the first quantity of the first powder and the second quantity of the second powder are selected so that a percolated matrix of the first powder is formed in the powder consolidated on the target, and
wherein the percolated matrix of the first powder forms a continuous conduction path within a volume of the CPC.

2. The pressure transducer of claim 1, wherein the target is one selected from a ball, a dart, a seat, a flow control valve, a multi-cycle valve, a cylindrical downhole part, the inside of a hollow cylinder, an internal surface of a well, and a layer in a transducer.

3. The pressure transducer of claim 1, wherein the piezoelectric material is one selected from the lead zirconate titanate family.

4. The pressure transducer of claim 1, wherein the second powder is one selected from polypropylene, polyimide, polytetrafluoroethylene, Polyvinylidene fluoride (PVDF), P(VDF-tetrafluoroethylene), phenolics, epoxies, Peek, Pek, and silicon based material.

5. A system of pressure transducers, comprising:
a first pressure transducer comprising:
a first electrode;
a second electrode; and
a first composite piezoelectric coating (CPC) configured to:
expand or contract in response to a first voltage applied across a first electrode and a second electrode; and
transmit the expansion or contraction as a pressure wave;
a second pressure transducer comprising:
a third electrode;
a fourth electrode; and
a second composite piezoelectric coating (CPC) configured to:
receive the transmitted pressure wave as an expansion or contraction; and
generate a second voltage across a third electrode and fourth electrode,
wherein at least one of the first CPC and second CPC is disposed on a target via consolidation of a powder entrained in a carrier gas stream upon impact of the carrier gas stream with the target,
wherein the powder further comprises:
a first quantity of a first powder of a piezoelectric material; and
a second quantity of a second powder combined with the first quantity of the first powder,
wherein the first quantity of the first powder and the second quantity of the second powder are selected so that a percolated matrix of the first powder is formed in the powder consolidated on the target, and
wherein the percolated matrix of the first powder forms a continuous conduction path within a volume of the at least one of the first CPC and second CPC.

6. The system of claim 5, wherein the target is one selected from a ball, a dart, a seat, a flow control valve, a multi-cycle valve, a cylindrical downhole part, the inside of a hollow cylinder, an internal surface of a well, and a layer in a transducer.

7. A method of measuring pressure over an area, comprising:
expanding or contracting a composite piezoelectric coating (CPC) in response to an applied pressure; and generating a voltage across a first and a second electrode based on the expansion or contraction of the CPC; wherein the composite piezoelectric coating is disposed over a large enough area to sense multiple pressures within the area, and wherein the CPC contains a percolated matrix of piezoelectric material particles that is surrounded by a second material, the percolated matrix of piezoelectric material particles forming a continuous conduction path within a volume of the CPC.

* * * * *